United States Patent [19]
Choi

[11] Patent Number: 5,752,757
[45] Date of Patent: May 19, 1998

[54] SLIDING CARD RECEPTOR FOR USE IN A SATELLITE BROADCASTING TUNER

[75] Inventor: Yong-Hwan Choi, Seoul, Rep. of Korea

[73] Assignee: Daewoo Electronics Co., Ltd., Seoul, Rep. of Korea

[21] Appl. No.: 756,510

[22] Filed: Nov. 26, 1996

[30] Foreign Application Priority Data

Nov. 27, 1995 [KR] Rep. of Korea ............... 95-43827

[51] Int. Cl.⁶ ............................................. A47B 88/00
[52] U.S. Cl. .............................. 312/319.1; 312/223.2; 312/311; 312/246; 361/724; 220/348
[58] Field of Search ............... 312/319.1, 271, 312/272, 273, 310, 311, 223.2, 334.27, 334.31, 275, 272.5, 276, 319.5; 74/110; 220/4.02, 348; 361/724, 725, 726, 727, 754

[56] References Cited

U.S. PATENT DOCUMENTS

| | | |
|---|---|---|
| 678,235 | 7/1901 | Ferracioli . |
| 2,814,544 | 11/1957 | Cornish . |
| 2,872,267 | 2/1959 | Machingo et al. ............ 312/276 X |
| 3,350,853 | 11/1967 | Revell ............................ 312/310 |
| 4,314,733 | 2/1982 | Smith ........................... 312/311 X |
| 4,610,490 | 9/1986 | Naito et al. ...................... 312/272 |
| 4,718,845 | 1/1988 | Sheffield et al. ................. 74/110 X |
| 4,765,548 | 8/1988 | Sing ............................ 220/348 X |
| 4,804,238 | 2/1989 | Bischof et al. ................. 220/348 X |
| 5,425,477 | 6/1995 | Gembler ......................... 312/273 |

FOREIGN PATENT DOCUMENTS

| | | | |
|---|---|---|---|
| 0350509 | 1/1990 | European Pat. Off. . | |
| 526091 | 6/1921 | France .......................... | 312/276 |
| 1123093 | 12/1955 | Germany ....................... | 312/310 |
| 172314 | 12/1934 | Switzerland ................... | 312/334.27 |

Primary Examiner—Peter M. Cuomo
Assistant Examiner—Hanh V. Tran
Attorney, Agent, or Firm—Anderson, Kill & Olick, P.C.

[57] ABSTRACT

A card receptor for use in a satellite broadcasting tuner includes a housing having a case slot therethrough, a door mounted to the housing and slidable up and down for opening and closing the case slot, a card case for receiving and keeping a card therein, the card case slidable between an inside position and an outside position of the housing through the case slot, a case guider fixedly mounted on an inner part of the housing, corresponding to the case slot, in order to guide the sliding movement of the card case, a coil spring for elastically connecting the card case with the door, one end thereof being retained with a hook seat of the door and a case driving gears for moving the card case toward the outside position thereof to push the card case out of the housing, and for moving the card case toward the inside position thereof, in response to the up and the down movements of the door.

4 Claims, 7 Drawing Sheets

SLIDING CARD RECEPTOR FOR USE IN A SATELLITE BROADCASTING TUNER

FIELD OF THE INVENTION

The present invention is directed to a card receptor for use in a tuner or a receiver for receiving a signal from a broadcasting satellite; and, more particularly, to a card receptor having a card case slidable between a protruding position for an inserting and an extracting operations of a card, and a withdrawn position for protecting the card in use.

DESCRIPTION OF THE PRIOR ART

In order to receive a signal from a broadcasting satellite positioned directly above the equator, which is sent from a broadcasting network or station on the ground, a tuner including a parabolic antenna and a converter is required. The signal received by the antenna is converted by the converter into a video or an audio signal, which is then sent to a TV or audio appliances by the tuner.

A partial exploded view of a conventional tuner 10 for use in a satellite broadcast receiving system is depicted in FIG. 1. The tuner 10 has a card slot 18 on a front panel constituting a part of a housing 14, through which a program subscription fee card 16 is inserted or extracted. The card slot 18 is exposed and provided with a center concave portion 20 for helping the user grasp the card 16. Reference numeral 12 represents a card reader which reads/writes the information from/on the program subscription fee card.

While the prior art card slot described above is capable of performing its assigned task, needs have continued to exist for an improved card receptor, since the card can easily be contaminated with dusts, motes and other particles in the conventional card slot.

SUMMARY OF THE INVENTION

It is, therefore, a primary object of the invention to provide a card receptor capable of enclosing a card from its surroundings to thereby eschew the possibility of contamination.

The above and other objects of the invention are accomplished by providing a card receptor for use in a satellite broadcasting tuner comprising: a housing having a case slot therethrough; a door mounted to the housing and being slidable up and down for opening and closing the case slot; a card case for receiving and keeping a card therein, the card case slidable between an inside position and an outside position of the housing through the case slot; a case guider fixedly mounted on an inner part of the housing, corresponding to the case slot, in order to guide the sliding movement of the card case; and a case driving means for moving the card case toward the outside position thereof to push the card case out of the housing, and for moving the card case toward the inside position thereof, in response to the up and the down movements of the door.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 3:
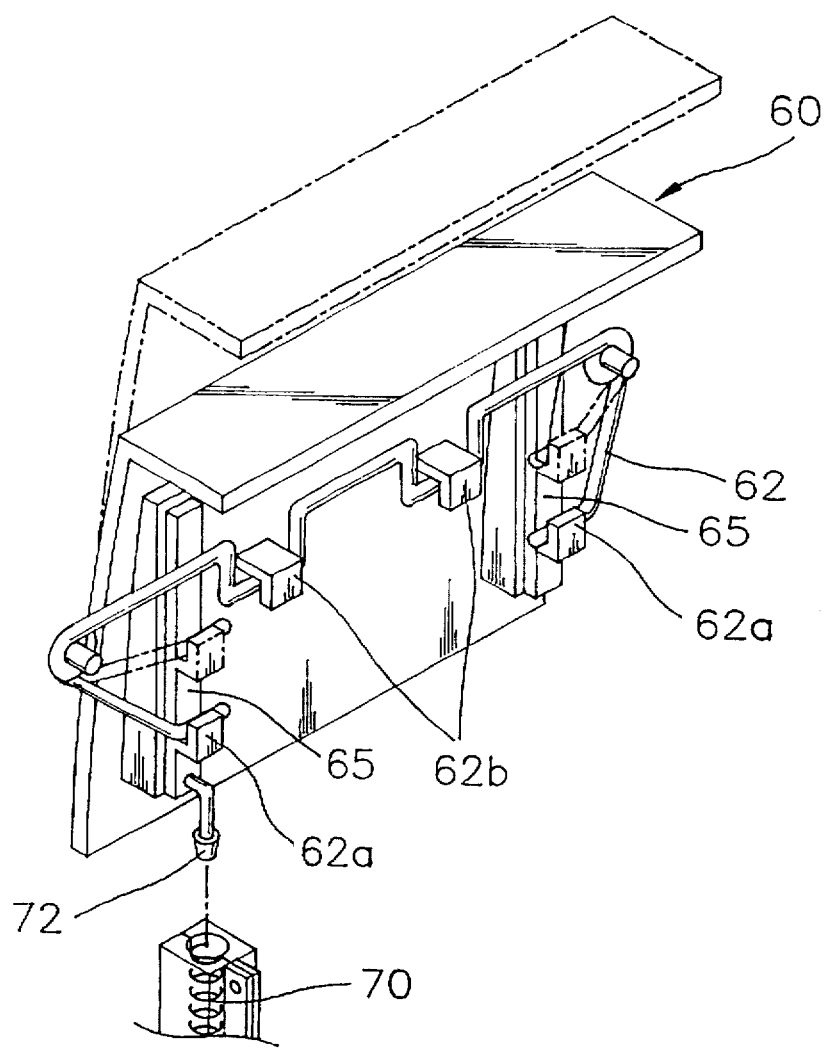
FIG. 3 depicts a schematic view of a door member of the inventive card receptor.
Figure 4:
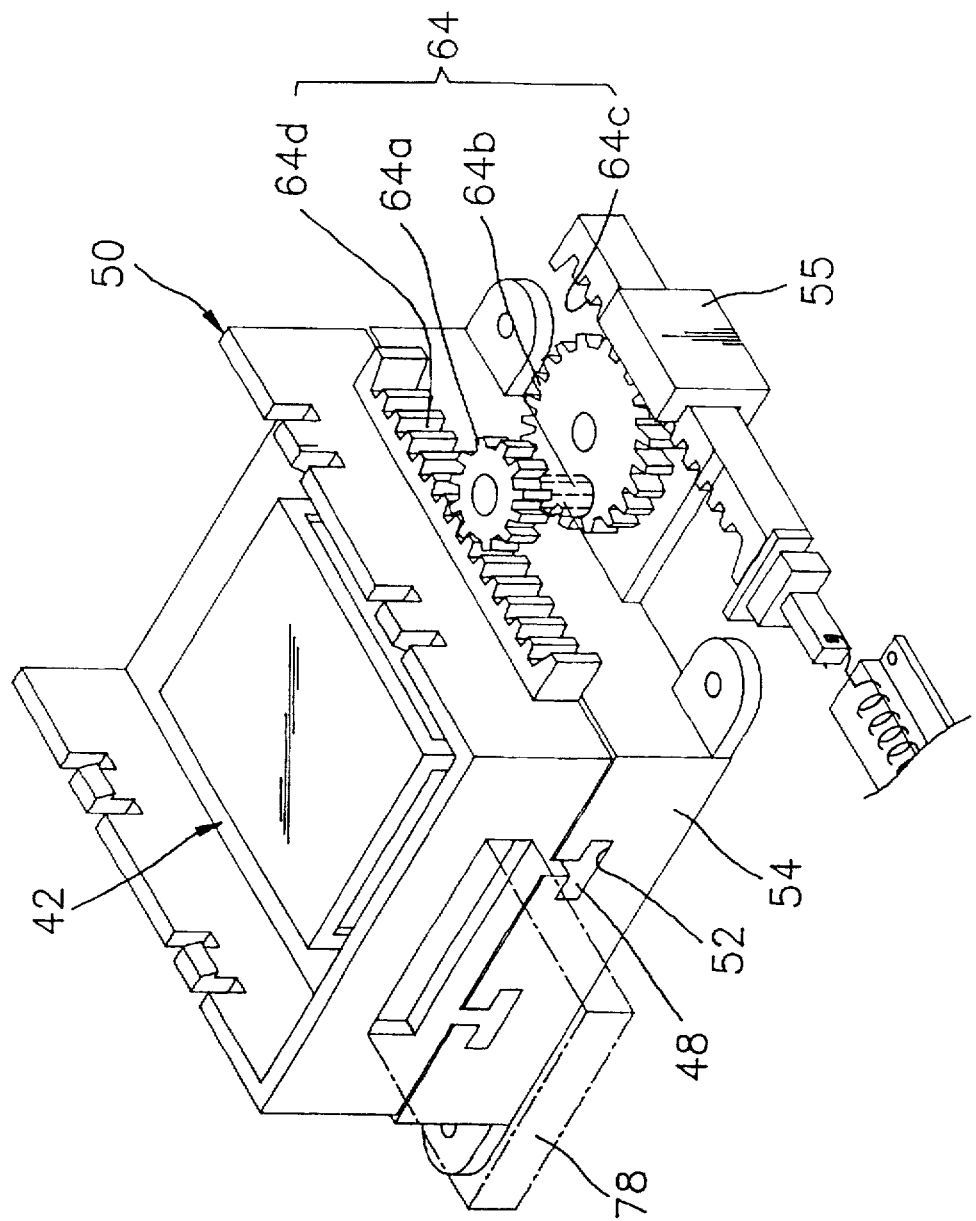
FIG. 4 illustrates a partial perspective view of a card case mounted within a housing of the inventive card receptor.

A preferred embodiment of the inventive card receptor for use with a satellite broadcasting tuner will be now described with reference to FIGS. 2, 3 and 4.

Figure 1:
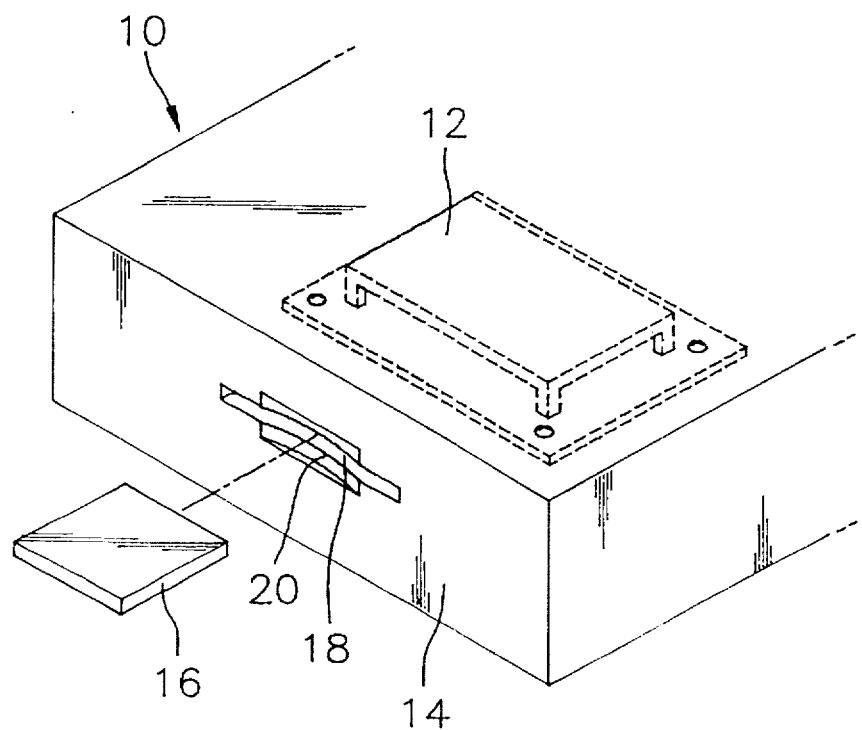
FIG. 1 shows a partial perspective view of a prior art satellite broadcasting tuner provided with a card insertion slot.
Figure 2:
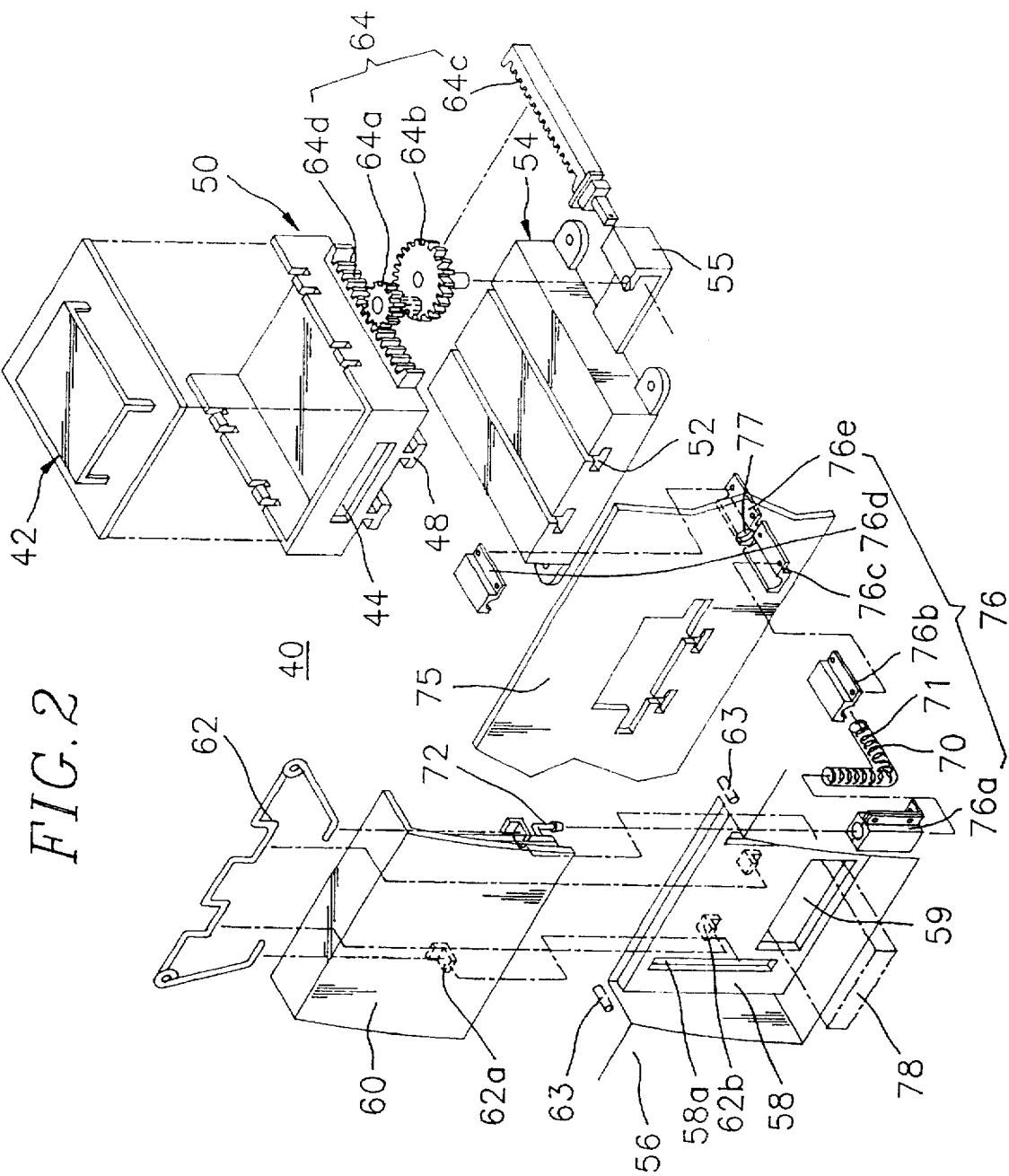
FIG. 2 represents an exploded perspective view of a card receptor in accordance with the present invention.
Figure 6:
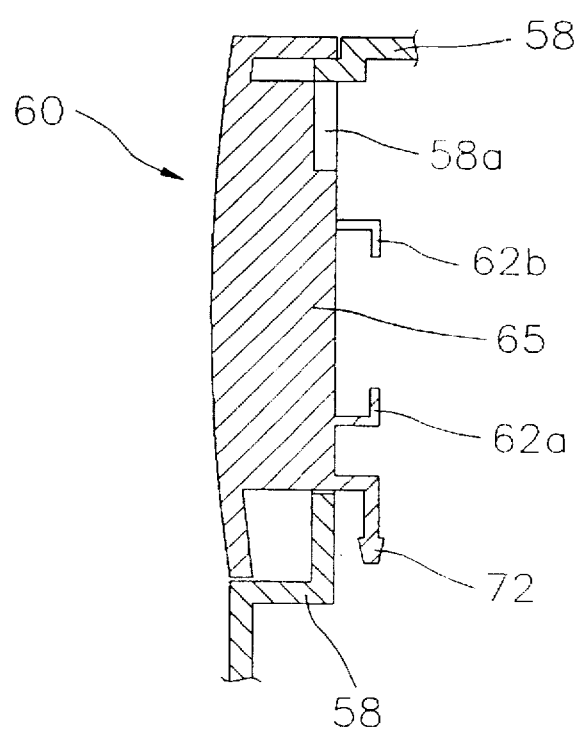
FIG. 6 presents a sectional view of the door member whose sliding guider is combined into a vertical slot.

FIG. 2 is an exploded view of the inventive card receptor 40. The card receptor 40 has a sliding door 60 for enclosing a program subscription fee card 78 from surroundings once it is inserted into the tuner. The sliding door 60 is slidably mounted on a descent portion 58 of a front panel 56 constituting a housing of the tuner. As best illustrated in FIGS. 3 and 6, a pair of sliding guiders 65 protrudes from a rear surface of the door 60. A pair of lugs 62a is formed on the sliding guiders 65, respectively. Returning to FIG. 2, when the sliding door 60 is mounted on the descent portion 58, the pair of lugs 62a pass through a pair of vertical slots 58a formed through the descent portion 58 to protrude out of a rear surface of the descent portion 58, respectively. The sliding door 60 constructed in this manner is slidable on the descent portion 58 up and down in such a way that the sliding guiders 65 slide along the vertical slots 58a, respectively.

The descent portion 58 has another slot, i.e., card case slot 59 through which a card case 50 protrudes out of the housing of the tuner. Placed behind the rear surface of the descent portion 58 are a pair of spring supports 62b which forces a tension spring 62 kept in place.

The tension spring 62 biases the sliding door 60 downward, preventing the door 60 from being detached from the descent portion 58. Due to the downward biasing force of the tension spring 62, the door 60 automatically moves down and closes the card case slot 59 when the user removes his hands from the door 60 after he slid up the door to open the door 60. As shown in FIG. 3, the tension spring 62 is retained by a pair of bosses 63 on a rear surface of the front panel 56, the spring supports 62b and the lugs 62a. As represented with a phantom line, when the sliding door 60 is slid up by the user, the pair of lugs shrinks or depresses the tension spring 62. As a result, when the force exerted by the user disappears, the sliding door 60 moves downward.

Returning to FIG. 2, the sliding door 60 has a spring hook seat 72 with which one end of a coil spring 70 is retained. The other end of the coil spring 70 is connected with a card case driving mechanism 64 which moves the card case 50 to and fro in a direction toward the card case slot 59. As a result, the card case 50 moves in response to the movement of the sliding door 60 through the coil spring 70 together with the driving mechanism 64. The coil spring 70 is covered with a first flexible covering 71; and both the coil spring 70 and the flexible covering 71 are positioned within a tube-shaped guider 76. The tube-shaped guider 76 is divided into a vertical tubular member 76a, a first horizontal tube 76b and 76c and a second horizontal tube 76d and 76e. The first horizontal tube having an upper and a lower members 76b and 76c is assembled into the vertical tubular member 76a so that they can communicate with each other. In order for the second horizontal tube 76d and 76e behind an inner wall 75 to communicate with the first horizontal tube 76b and 76c, the inner wall 75 has a through-hole 77.

Figure 7:
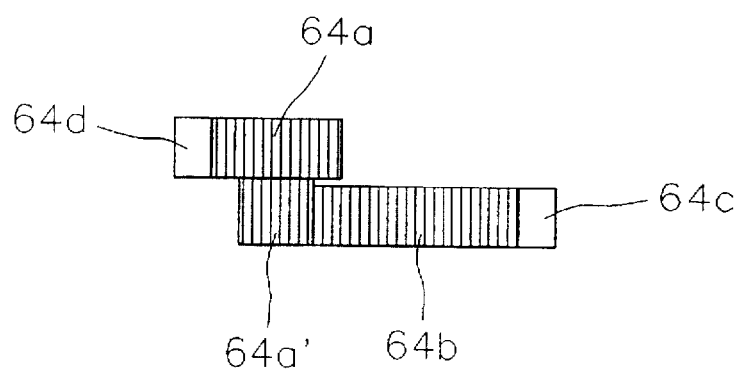
FIG. 7 represents a schematic view of a card case driving mechanism in accordance with the present invention.

The card case driving mechanism 64 connected with the coil spring 70 has two rack gears, i.e., a driving and a driven racks 64c and 64d, and two gears 64a and 64b for transmitting a power between the two rack gears 64c and 64d, with the gear 64a coaxially connected with a gear 64a", as shown in FIG. 7. As better illustrated in FIG. 4, the driving rack 64c is connected to the coil spring 70; and the driven rack 64d is integrally formed with the card case 50. It can be understood that when the driving rack 64c moves, the driven rack 64d moves in an identical direction to that of the driving rack 64c.

Figure 5:
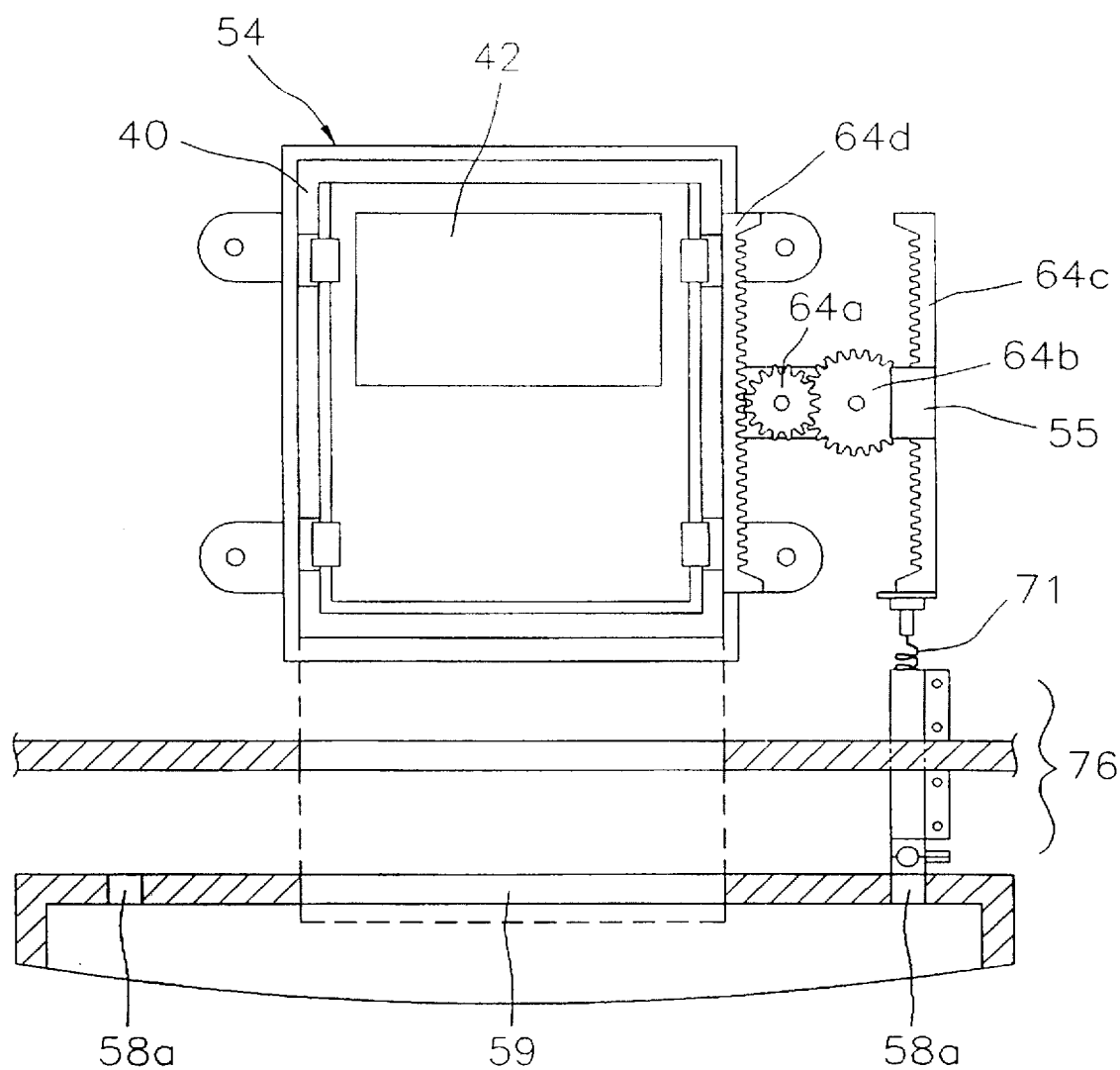
FIG. 5 offers a partial sectional plan view of the inventive card receptor.

The card case 50 has a card reader 42 which reads/writes the information from/on the program subscription fee card 78. Formed through the card case 50 is a card slot 44 through which the fee card 78 is inserted into the card case 50. The card case 50 further has a pair of T-shaped protuberances 48 formed on a bottom surface thereof. The card case 50 is slidably mounted on a bed 54 which has a pair of T-shaped grooves 52 corresponding to the T-shaped protuberances 48. The card case 50 constructed in this manner is slidable between a protruding position as indicated with a dotted line in FIG. 5, wherein the card slot 44 is outside the descent portion 58 and a withdrawn position wherein the card slot 44 is inside the descent portion 58.

On the other hand, the bed 54 fixed to a bottom of the housing further has a bracket 55 for providing a mounting place for the two gears 64a and 64b and the driving rack 64c.

Operation of the inventive sliding card receptor will be described with reference to FIG. 2.

When the user slides up the sliding door 60 in order to insert the card 78 into the tuner, the driving rack gear 64c is resiliently moved forward by the coil spring 70 connected to the sliding door 70, advancing the card case 50 so that the card slot 44 of the card case 50 protrudes out of the tuner housing through the card case slot 59. When the user completes the card insertion and lets the sliding door 60 off, the sliding door 60 automatically slides down by the tension spring 62. At the same time, the driving rack gear 64c is resiliently moved backward by the coil spring 70, backing the card case 50 to the withdrawn position thereof. As a result, the card 78 and the card case 50 are enclosed by the sliding door 60 from the surroundings.

When the user wishes to extract the card 78 from the tuner housing, the user slides up the sliding door 60 and removes the card 78 from the card slot 44 which has protruded out of the tuner housing. After the removal of the card 78 from the card slot 44, the door automatically closes the card case slot 59 by being let off.

Although the invention has been shown and described with respect to the preferred embodiments, it will be understood by those skilled in the art that various changes and modifications may be made without departing from the spirit and scope of the invention as defined in the following claims.

What is claimed is:

1. A card receptor for use in a satellite broadcasting tuner comprising:

a housing having a case slot therethrough;

a door mounted to the housing and being slidable up and down for opening and closing the case slot;

a card case for receiving and keeping a card therein, the card case slidable between an inside position and an outside position of the housing through the case slot, the card case including a pair of T-shaped protuberances;

a case guider fixedly mounted on an inside of the housing, corresponding to the case slot, in order to guide the sliding movement of the card case, the case guider includes a pair of T-shaped grooves corresponding to the T-shaped protuberances, respectively; and a case driving means for moving the card case toward the outside position thereof to push the card case out of the housing, and for moving the card case toward the inside position thereof, in response to the up and the down movements of the door, and wherein the case driving means comprises:

an elastic connection for elastically connecting the card driving means with the door, one end thereof being retained with a hook seat of the door;

a driving rack gear hooked by the other end of the elastic connection;

a first pinion engaged with the driving rack gear;

a second pinion engaged with the first pinion; and a driven rack gear fixed to a lateral surface of the card case and engaged with the second pinion.

2. The card receptor of claim 1, wherein the elastic connection is a coil spring covered with a covering.

3. A card receptor for use in a satellite broadcasting tuner comprising:

a housing having a case slot therethrough;

a door mounted to the housing and being slidable up and down for opening and closing the case slot, wherein the door is biased downwardly by a resilient means;

a card case for receiving and keeping a card therein, the card case slidable between an inside position and an outside position of the housing through the case slot, the card case including a pair of T-shaped protuberances;

a case guider fixedly mounted on an inside of the housing, corresponding to the case slot, in order to guide the sliding movement of the card case, the case guider includes a pair of T-shaped grooves corresponding to the T-shaped protuberances, respectively; and a case driving means for moving the card case toward the outside position thereof to push the card slot portion out of the housing, and for moving the card case toward the inside position thereof, in response to the up and the down movements of the door.

4. The card receptor of claim 3, wherein the resilient means is a tension spring mounted on the housing in such a manner that it is shrunk by a pair of lugs of the door when the door slides up.

* * * * *